United States Patent [19]

Wright

[11] Patent Number: 4,618,291
[45] Date of Patent: Oct. 21, 1986

[54] NUT MEMBER AND MINE ROOF SUPPORT SYSTEM INCORPORATING SAME

[75] Inventor: Raymond L. Wright, Syracuse, N.Y.

[73] Assignee: The Eastern Company, Naugatuck, Conn.

[21] Appl. No.: 704,254

[22] Filed: Feb. 22, 1985

[51] Int. Cl.[4] .................. E21D 20/02; F16B 37/00
[52] U.S. Cl. ............................... 405/261; 411/3; 411/82; 411/427
[58] Field of Search ......................... 411/1–5, 411/8–11, 15, 427, 429; 405/259–261

[56] References Cited

U.S. PATENT DOCUMENTS

| | | | |
|---|---|---|---|
| 3,749,433 | 7/1973 | Mankowsky | 411/427 |
| 3,979,918 | 9/1976 | Vidler | 411/8 |
| 4,122,753 | 10/1978 | Kuhlmann et al. | 411/2 |
| 4,132,080 | 1/1979 | Hansen | 405/261 |
| 4,170,918 | 10/1979 | Burge | 411/427 |
| 4,295,761 | 10/1981 | Hansen | 411/8 |
| 4,310,273 | 1/1982 | Kirrish | 411/338 |
| 4,347,020 | 8/1982 | White et al. | 405/259 |
| 4,477,209 | 10/1984 | Hipkins, Jr. et al. | 405/259 |

Primary Examiner—Gary L. Smith
Assistant Examiner—Neill Wilson
Attorney, Agent, or Firm—Charles S. McGuire

[57] ABSTRACT

A nut member of special design is disclosed in conjunction with other elements to provide a post-tensionable mine roof support assembly. The nut member includes an upper, stem portion extending through the opening in a support plate and a lower, base portion of larger diameter than the plate opening. A through opening in the nut includes an internally threaded portion at the upper end of the stem and an internal socket for wrench engagement at the lower end of the base. Between the threaded portion and socket is an internal bore having a diameter greater than the threaded portion. Breakable means, preferably annular in form and cast integrally with the rest of the nut member, extends into the bore to a position with the cylindrical plane extending downwardly from the threaded portion. Thus, a threaded end of an elongated rod may be engaged with the threaded portion of the nut, extending into abutting engagement with the breakable means, and the other end of the rod advanced into a mine roof drill hole behind a standard resin cartridge. The cartridge is broken and the contents mixed by rotating the nut member, and thereby the rod, by a wrench engaged with the socket. By stopping rotation for a few seconds and allowing the resin to harden sufficiently to prevent further rotation of the rod, excess torque applied to the nut member will cause the threaded rod end to break through the breakable means, permitting the nut to be tightened against the support plate and the rod tensioned with the end of the rod extending into the bore area between the breakable means and the socket.

2 Claims, 8 Drawing Figures

NUT MEMBER AND MINE ROOF SUPPORT SYSTEM INCORPORATING SAME

BACKGROUND OF THE INVENTION

The present invention relates to mine roof support systems and, more particularly, to a post-tensionable, resin anchored rod with a novel nut member having a portion which is breakable upon application of excess torque after the resin has set sufficiently to prevent continued rotation of the rod threadedly engaged with the nut member.

One of the most popular types of mine roof support is the resin-anchored, elongated rod (i.e., a bolt or rebar), wherein a two-compartment cartridge is fractured within a drill hole in the mine roof and the components mixed by advancement and rotation of the rod. A short time after mixing, the resin mix hardens to anchor the rod securely in the drill hole, thereby holding a bearing plate carried by the rod, in supporting engagement with the mine roof surrounding the drill hole entry in the roof.

It is also common in such roof support systems to provide means for tensioning the rod after the resin has set to produce compressive forces further reinforcing the rock strata of the mine roof. Beginning with the roof support system of U.S. Pat. No. 3,877,235, the elongated rods have been threadedly engaged with a nut, or other threaded member with a stop means to limit advance of the rod into or through the nut, rotationally coupling the rod to the nut. Thus, rotation of one of the elements is transmitted to the other to cause breakage of a two-compartment resin cartridge and mixing of the components within the mine roof drill hole. After sufficient setting of the resin mix, application of excess torque fractures or otherwise displaces the stop means, permitting further relative rotation of the rod and nut member, thereby drawing the support plate into close engagement with the roof about the drill hole and tensioning of the rod.

Among the resin-anchored, tensioned rod roof support systems wherein a relative rotation stop means is employed are those combining an expansion anchor with a resin anchorage, as exemplified in U.S. Pat. Nos. 4,160,614, 4,162,133 and 4,419,805. Other support systems of this general type, such as those shown in U.S. Pat. Nos. 4,051,683, 4,100,748 and 4,122,681 combine two elongated rods with an intermediate coupling member wherein the stop means is incorporated. Still others employ a nut member on a threaded end of the elongated rod which extends through the roof support plate with stop means rotationally coupling the nut, to which the rotative force is applied, to the rod until the latter is anchored by the resin and excess torque applied to the nut overcomes the stop means. Support systems of the latter type, with which the present invention is concerned, are disclosed in, among others, U.S. Pat. Nos. 3,979,918, 4,295,761 and 4,347,020.

In the support systems which include a nut on the lower, threaded end of the anchored rod, one or more additional elements are often employed to form the stop means. That is, a stop plug, disc, shear pin, or the like, is incorporated in or with the usual body portion having an internally threaded opening. Although drilling and tapping operations are required for the special roof support system nut members, as with any machined nut, the cost of both added parts and further manufacturing operations involved in incorporating the part(s) forming the stop means adds to the overall cost of the unit. It is the customary construction of such systems that the threaded, lower end of the rod extend through and below the nut member when the rod is tensioned, thus extending downwardly into the mine passage, an undesirable condition, particularly in mine passages of limited height, i.e., in "low coal" seams.

It is a principal object of the present invention to provide a mine roof support system wherein an elongated rod is anchored in a drill hole by a resin grouting at its upper end, and a nut element having a breakable stop means is installed on the lower, threaded end of the rod to effect tensioning thereof, wherein the system is particularly suited for use in low coal areas.

Another object is to provide a nut element for use in a mine roof support system and incorporating means breakable by application of excess torque to the nut when threadedly engaged with a resin-anchored rod, wherein the nut element is cast as an inegral unit and no operations are required to complete the nut other than drilling and tapping to provide the internal threads.

A further object is to provide a resin anchored, post tensionable, mine roof support system employing a malleable iron nut for threaded engagement with the lower end of a tensioned rod wherein the nut is rotated by a male wrench engaged with an internal socket in the base of the nut and the lower end of the rod does not extend beyond the lower end of the nut.

Other objects will in part be obvious and will in part appear hereinafter.

SUMMARY OF THE INVENTION

The mine roof support system includes conventional items, including a breakable, two-compartment resin package, an elongated rebar with one end threaded, and a roof support plate. A nut member of unique design includes a stem portion extending through the opening in the roof plate and threadedly engaged with the end of the rebar, the plate being supported upon a base portion of the nut. The nut includes breakable structure providing a stop means against which the end of the rebar is engaged when threaded into the nut, preventing further relative rotation between the nut and rebar.

The end of the rebar opposite that engaged with the nut is inserted into a mine roof drill hole behind one or more resin cartridges. As the rod is advanced through the cartridge(s) toward the end of the drill hole, the resin components are released from their respective compartments and, aided by rotation of the rebar, mixed together to form the hardenable grouting material. The rebar may be rotated by engaging a wrench with the nut and rotating the latter, since the nut and rebar are rotationally locked.

When the resin mix has hardened sufficiently to effectively prevent further rotation of the rebar, excess torque applied to the nut member will cause the end of the rebar to break through the stop means, allowing the nut to be tightened, drawing the support plate into tight engagement with the roof surface surrounding the drill hole and tensioning the rod to compress and reinforce the rock strata above the roof. The nut member, in the illustrated form, has a through opening, that portion extending into the lower end (base) forming an internal socket with surfaces for engagement by a male wrench. The internally threaded portion of the opening extends from the upper end of the stem for a predetermined part of the axial length of the nut. A bore of larger diameter than the threaded portion extends between the threaded portion and socket.

The breakable stop means extends integrally from the wall of the bore inwardly to at least partially cover the extension of the cylindrical plane of the threaded portion through the bore. In the preferred embodiment, the breakable means is annular in form, providing a shear ring extending about the periphery of the bore. It is axially spaced below the threaded portion by a distance sufficient to accommodate the pointed lead end of a drill bit or tapping die so that the upper part of the opening through the nut may be drilled and tapped without contact of the shear ring by the tool. Also, the shear ring is axially spaced from the wrench socket to provide a take-up zone for the end of the rod as the nut is tightened after breaking the shear ring by applying excess torque to the nut with the rod held stationary by the hardened resin. The shear ring preferably decreases in thickness from its juncture with the bore wall to the inner ring periphery.

DETAILED DESCRIPTION

Figures 1, 2, 3, 4:
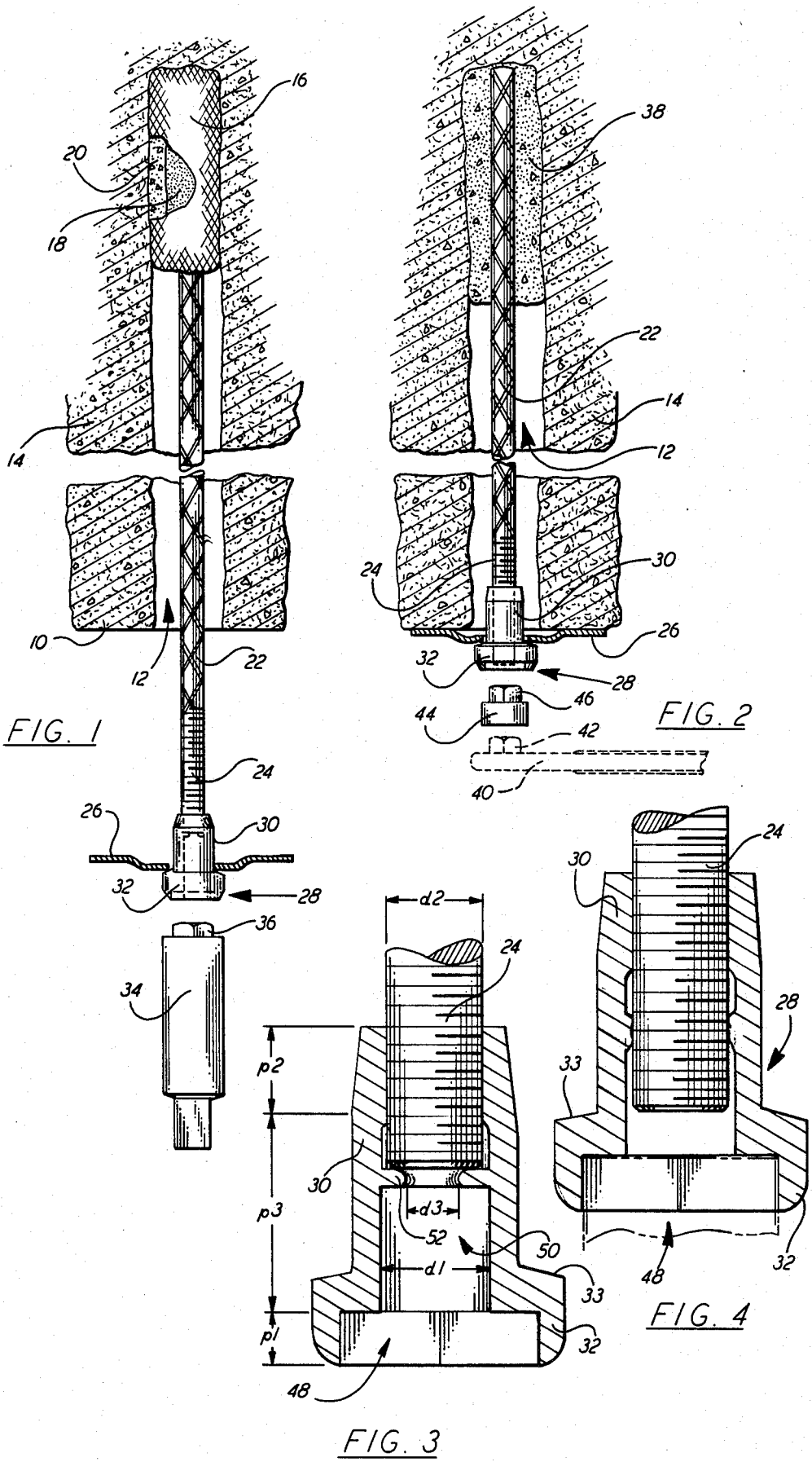
FIG. 1 is an elevational view, of the mine roof support system of the invention assembled and in the initial stages of insertion into a drill hole in a mine roof, which is shown in vertical section through the hole.
FIG. 2 is an elevational view of the support system of FIG. 1 shown in the fully installed position.
FIG. 3 is an enlarged, elevational view in full section of one of the elements of the support system of FIGS. 1 and 2, with a fragment of another element, in their relative positions when assembled and during initial installation.
FIG. 4 is the same view as FIG. 3, showing the elements as fully installed.

Referring now to the drawings, in FIGS. 1 and 2 is shown a roof surface 10 of a mine passageway with drill hole 12 extending for a predetermined depth into rock strata 14 above the roof. The mine roof support system includes resin cartridge 16 containing two initially separated components 18 and 20, typically a polyester resin and a curing agent, an elongated rod in the form of steel rebar 22 having threads 24 extending from one end for a portion of its length, support plate 26 and nut element 28. Resin cartridge 16, threaded rebar 22 and roof support plate 26 are all standard items of manufacture and may be of any suitable type previously employed in mine roof support systems. Nut element 28 is of special design, as will be explained in more detail later, having internal threads for engagement by threads 24 of rebar 22 and stop means for limiting the initial extent of threaded engagement of the nut and rebar.

Nut element 28 includes stem and base portions, denoted by reference numerals 30 and 32, respectively, and will be referred to as having upper and lower ends corresponding to the position in which the nut element is shown in all Figures, i.e., with stem portion 30 directed upwardly. The elements are assembled by placing stem portion 30 through the opening in support plate 26 with the latter resting upon the upper surface 33 of base portion 32, as seen in FIG. 1, with threads 24 of rebar 22 engaged with the internal threads of nut element 28 to the extent permitted by the stop means. Cartridge 16 is inserted in drill hole 12, followed by the upper end of rebar 22.

Wrench adapter 34, the preferred structure of which is also explained later in more detail, includes upwardly extending stud 36 for engagement in a socket provided in the lower end of nut element 28. Wrench adapter 34 is affixed to a standard piece of mining equipment normally used both for drilling the holes in the mine roof and for the rotation of roof bolts to engage expansion anchors and/or to break and mix the contents of a resin package. Such equipment, known as a pinner, is usually hydraulically driven and includes a vertically movable arm having a socket near the end for holding the drill steel and for engaging a bolt head and imparting rotation thereto.

In the present case, wrench adapter 34 is engaged in the pinner socket and advanced vertically, forcing the upper end of rebar 22 through cartridge 16 and releasing the contents thereof. Rotation of adapter 34 is transmitted to nut element 28 and thus to rebar 22 since the nut cannot be rotated relative to the rebar due to the stop means. The resin cartridge components are mixed after a few seconds of rotation following fracture of the cartridge walls, and in another few seconds the hardened resin mix, indicated in FIG. 2 by reference numeral 38, will effectively prevent further rotation of rebar 22. Excess torque then applied to nut element 28 will cause the stop means to fracture, permitting the nut element to be further advanced on threads 24 of stationary rebar 22, thereby urging support plate 26 into close engagement with roof surface 10 surrounding drill hole 12 and tensioning rebar 22 to a desired degree, as shown in FIG. 2.

A standard, manual, torque wrench 40 may be used at any time subsequent to the installation to determine the tension on the rebar and, if desired, apply additional tension. Stud 42 on standard torque wrenches is normally too small to engage the socket in base portion 32 of nut element 28. Therefore, adapter 44, having an internal socket sized to accept stud 42 and a larger, upwardly extending stud 46 sized to engage the internal socket of the nut element, is employed.

Turning now to FIGS. 3 and 4, nut element 28 is shown engaged with threads 24 on the lower end of rebar 22. Internal socket 48, defined by flat, wrench engagement surfaces, extends into the lower end of base portion 32 for a first axial or longitudinal portion p1 of the vertical length of nut element 28. Stem portion 30 is internally threaded from the upper end for a second longitudinal portion p2 of the length of the nut member. Socket 48 and the threaded portion of the nut element communicate via bore 50 which extends for a third longitudinal portion p3 of the nut element. Bore 50 is preferably a cylindrical, unthreaded opening and has a diameter d1 larger than that of the internally threaded portion, i.e., larger than threads 24 on rebar 22, indicated as d2.

The previously mentioned stop means incorporated in nut element 28 are shown in FIG. 3 in the form of an annulus or ring 52, extending inwardly from the wall of bore 50 to a diameter d3, which is less than diameter d2 of the threaded portion of nut element 28 and of threads 24, i.e., d3<d2<d1. Thus, the inner periphery of ring 52 extends into the cylindrical plane of the extension of the threaded portion into bore 50 and prevents threaded advance of nut element 28 onto threads 24 on rebar 22 past the position shown in FIG. 3, wherein the lower end of the rebar abuts ring 52. It is with the elements in this position that rotation of nut element 28 is transmitted to rebar 22 to effect mixing of the resin components. After the resin mix has hardened sufficiently to prevent further rotation of rebar 22, excess torque applied to nut element 28 as previously described will cause the lower end of rebar 22 to break through ring 52 and the nut is then tightened to the desired degree, bringing the elements to the position of FIG. 4.

Figure 5:
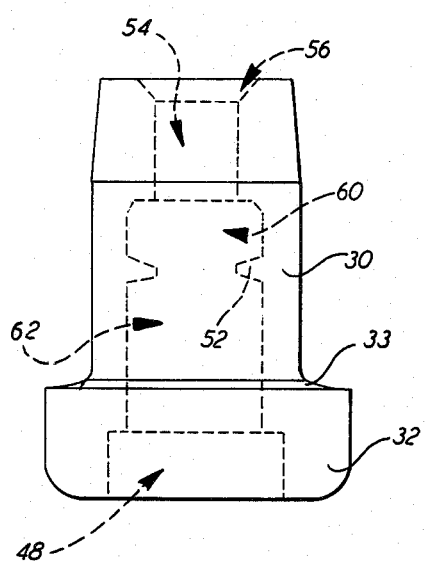
FIG. 5 is an elevational view, of the nut element shown in FIGS. 3 and 4 in the form in which it is cast, before machining.

Nut element 28 is a unitary element, preferably fabricated as a malleable iron casting, shown in FIG. 5 in a preferred, as-cast form. The exterior of the element, as well as socket 48, bore 50 and ring 52 are in finished condition, requiring no machining or other operations (other than the preferred pearlitizing of the entire unit as a final step), after being removed from the mold. The inner diameter of ring 52, and opening 54 at the upper end of the element are cored to provide the desired diameters in the casting. Opening 54 is flared outwardly at the top, as indicated at 56, to provide a lead-in for a drill bit and tapping die.

Figure 6:
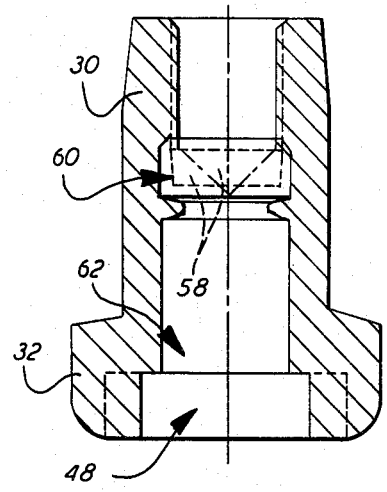
FIG. 6 is the same view as FIG. 5, showing the element in full section as it is drilled and tapped to provide internal threads, with the tool shown in phantom lines.

The cast part is placed on a drilling fixture and positioned beneath a bit which is lowered into opening 54 to drill the hole to the proper diameter. After drilling, the drilled opening is tapped to provide the internally threaded portion of the nut opening. The stroke of the drilling and tapping tools is controlled so that they do not contact ring 52, the ends of the tools being shown at the lowest extent of their travel in phantom lines in FIG. 6, denoted by reference numeral 58. The complete drilling and tapping of the opening to diameter d2 is possible without contact of ring 52 by the tools since the lead ends thereof are accommodated in so-called lead zone 60, provided by spacing the upper side of ring 52 downwardly an appropriate distance from the lower end of the threaded portion (p2). Also, the lower side of ring 52 is spaced from socket 48 to provide a so-called torque take-up zone 62 wherein the lower end of rebar 22 may extend after ring 52 is sheared or broken and nut element 28 is tightened on threads 24 of the rebar.

Figure 7:
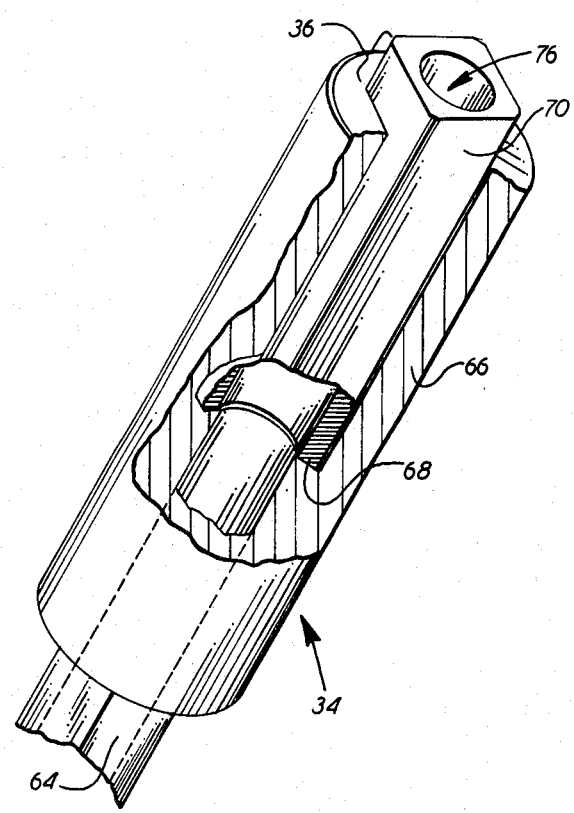
FIG. 7 is a fragmentary, perspective view, partly in section, of a wrench adapter for engagement with the nut element of FIGS. 3-6.
Figure 8:
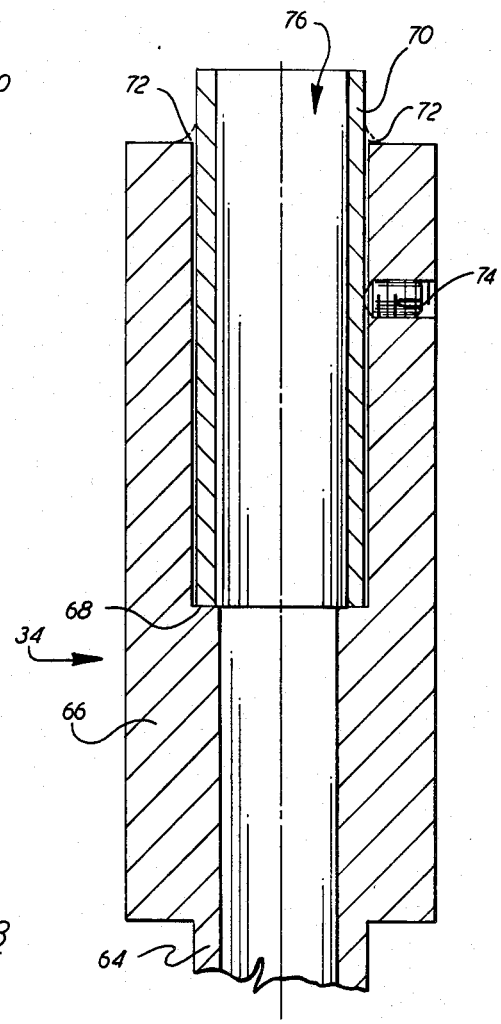
FIG. 8 is an elevational view of the wrench adapter of FIG. 7 in full section.

The lower end of rebar 22 may extend downwardly through torque take-up zone 62 as far as socket 48, assuming a wrench stud to be positioned therein, or if it is desired that the end of the rebar may extend into the area of socket 48, the wrench stud may be provided with an opening for such purpose. The wrench adapter used in the present invention for advancing rebar 22, breaking resin cartridge 16 and mixing the contents thereof, and rotating nut element 28 to break shear ring 52 and apply the desired initial torque is shown in FIGS. 7 and 8. Lower portion 64 is externally sized for placement in the socket of a standard pinner arm, initially used to hold and rotate the drill bit which forms the drill holes in the mine roof. Body portion 66 is formed integrally with lower portion 64 and an opening extends through both portions. The opening is of square cross section in at least an enlarged upper area, meeting the smaller portion at shoulder 68. Square insert 70 is inserted in the upper area of the opening in body portion 66 and has external lateral dimensions suitable for engagement in socket 48 of nut element 28, and a length such that when the lower end is seated on shoulder 68 the upper end extends above body portion 66 for a distance approximating the depth of socket 48. Insert 70 may be permanently coupled to body portion 66 by welding, as indicated at 72, or removably coupled by set screw 74 extending into a threaded opening in the side of body portion 66. Opening 76 extends through insert 70 and has a diameter larger than that of threads 24 on rebar 22, i.e., larger than d2, whereby the end of the rebar may extend into the wrench adapter insert, if necessary.

From the foregoing, it may be seen that the objects of the invention are efficiently achieved, the roof support system being not only initially secure but providing for re-torquing at any time subsequent to installation. The unique nut design incorporates a breakable stop means without involving any fabrication operations or materials other than drilling and tapping of the integral, one-piece casting. The threaded portion of the nut which engages the rebar is located entirely within the mine roof drill hole, leaving only a short portion of the nut below the roof plate, and the lower end of the rebar, when fully tensioned, does not extend below the nut, whereby the assembly is eminently suited for use in low coal seams, presenting minimal obstruction within the mine passage.

The breakable stop means are disclosed in a preferred construction as a continuous, annular shoulder, or open ring extending into the nut bore, spaced from both the threaded portion and the wrench engagement socket. Other configurations are, of course, possible such as, for example, a cast-in shear pin extending completely across the bore, single or multiple shear pins or studs extending into the bore from the wall thereof, and a non-continuous shear shoulder. In any case, upper surface 33 of nut base portion 32 is cast as a radial draft surface to provide even force distribution on support plate 26.

What is claimed is:

1. An improved mine roof support system including a support plate having a central opening, and an elongated rod having a leading end inserted into a drill hole behind a resin cartridge and advanced to break the cartridge and rotated to mix the components thereof to form a hardened, chemical anchor for said rod, and a trailing end of predetermined diameter from which said rod is threaded for a portion of its length. wherein the improvement comprises a nut element engaged with a said threaded portion of said rod, said nut element comprising:
   (a) a generally cylindrical stem portion of diameter less than that of said central opening in said support plate and extending therethrough into said drill hole;
   (b) a base portion of cross sectional dimensions larger than said support plate opening and integrally adjoining said stem portion on the side of said plate opposite said rod;
   (c) an unobstructed, through opening extending axially from end to end of said nut element, through both said stem and base portions, the wall of said through opening extending into said base portion providing wrench engagement surfaces;
   (d) a frangible, annular, shear ring extending integrally inward from the wall of said through opening to define a circular lip having a diameter less that said predetermined diameter;

(e) an internally threaded portion extending from the end of said through opening in said stem portion opposite the juncture thereof with said base portion for a first axial length of said nut element;

(f) a first, smooth-walled portion of said through opening of diameter larger than said predetermined diameter extending for a second axial length of said nut element from the terminus of said threaded portion to said shear ring; and (g) a second, smooth-walled portion of said through opening of diameter larger than said predetermined diameter extending for a thrid axial length of said nut element from said shear ring to said wrench engagement surfaces, whereby said rod may be threaded into said nut element to bear against said shear ring and rotation of said nut by a wrench engaged with said wrench engagement surfaces will be imparted to said rod, thereby mixing said resin components and excess torque applied to said nut element after said components harden to prevent rotation of said rod will fracture said shear ring and permit further rotation of said nut element to tension said rod.

2. The invention according to claim 1 wherein said base portion is externally cylindrical and curved about its lower, external edge, having an upper surface for engagement with said roof plate about said opening therein.

* * * * *